Feb. 17, 1942.                F. BURCHELL                2,273,434
                            OPHTHALMIC DEVICE
                           Filed June 19, 1940
Fig.1.
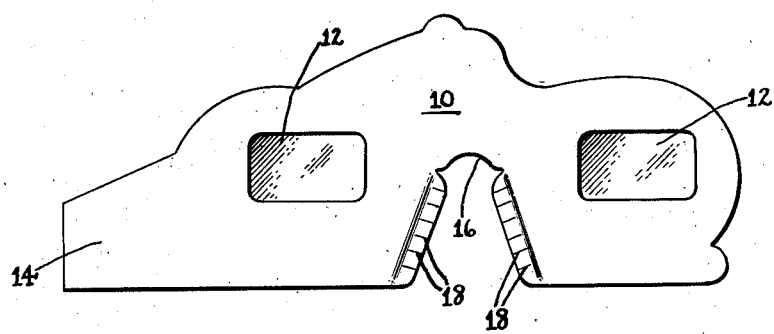
Fig.2.
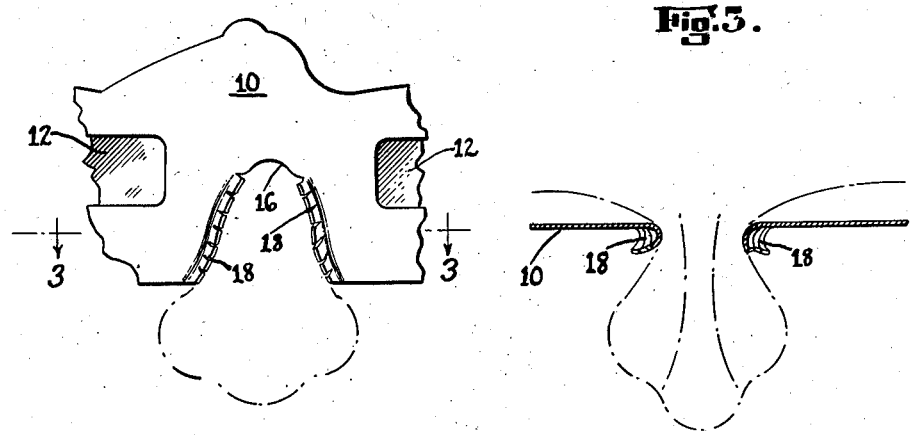
Fig.3.
INVENTOR
Ford Burchell
BY
Brown & Jones
ATTORNEYS Patented Feb. 17, 1942

2,273,434

UNITED STATES PATENT OFFICE 2,273,434

OPHTHALMIC DEVICE

Fford Burchell, Port Chester, N. Y., assignor of twenty-three one-hundredths to John Q. A. Halloway, Brooklyn, N. Y., and one-tenth to James J. Ryan, New York, N. Y.

Application June 19, 1940, Serial No. 341,279

2 Claims. (Cl. 88—41)

This invention relates to a holder for optical devices and more specifically to a pince-nez.

In general, it is an object of the invention to provide a device of the character described, which will efficiently perform the purposes for which it is intended, which is simple and economical of construction, which can be expeditiously, conveniently and safely manipulated, and which can be readily manufactured and assembled.

Another object is to provide a device which may be inexpensive and may be discarded but which stays firmly in position while it is in use; to provide a pince-nez which adapts itself to the shape of the nose of the wearer; and to provide such a device which may be planar and/or made of paper or other material.

Other objects of the invention will in part be obvious and will in part appear hereinafter.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawing, in which:

Figure 1 is a view in elevation of a device embodying one form of the invention;

Fig. 2 is a view in elevation of a detail of the nose portion, in operation, of the device shown in Fig. 1; and Fig. 3 is a section of the detail shown in Fig. 2 taken on the line 3—3 of Fig. 2.

In the drawing 10 denotes a piece of material which may be flat and which may be of any convenient substance, for example, heavy paper or light cardboard. Apertures 12 permit light to pass through to the eyes of the wearer. Associated with said apertures there may be any optical element. Such an element might be a sheet of polarizing material, e. g. "Polaroid," which may or may not be tinted. There may be an extension 14, at any point of the device, which may be utilized as a handle.

Nose notch 16 is intended to be fitted over the nose of the wearer. Means are provided which grip any one of various forms of noses and/or irregularities in any one nose. The edge 16 is scored with scorings 18 which may be sufficiently deep actually to form slits leaving the material along the edge discontinuous, although the sides of the slits may be in contact.

In operation, the device is pressed over the nose with the material adjacent the nose being at an angle with the rest of the device and lying along the surface of the nose. Depending upon the exigencies of the case, certain of the areas or protuberances between the slits 18 will be bent back more than others in irregular displacements or they may, severally, successively, and in order, suffer a gradually changing displacement. The resiliency of the material may be availed of to return them to a position from which they may be moved to grip another nasal gibbosity. The device has been found to grip with a surprising tenacity.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An article comprising a frame for spectacles, said frame having a nose notch lying substantially in the plane of said frame, a plurality of gripping elements attached to said frame along each of the side edges of said notch and adapted to extend forwardly from said frame and adapted to take various angles with the plane of said frame whereby said elements are bent at various angles by the contours of the nose of the wearer as said article is forced back over the nose of the wearer, said elements being originally in the plane of said frame and the material of said elements and said frame along the side edges of said notch being of a resilient material whereby said elements tend to resist the deformation caused by the attaching of the article to the nose and hence grip the sides of the nose of the wearer.

2. An article comprising a frame for spectacles, said frame having a nose notch lying substantially in the plane of said frame, a plurality of gripping elements attached to said frame along each of the side edges of said notch and adapted to extend forwardly from said frame and adapted to take various angles with the plane of said frame whereby said elements are bent at various angles by the contours of the nose of the wearer as said article is forced back over the nose of the wearer, said elements being originally in the plane of said frame and the material of said elements and said frame along the side edges of said notch being of a fibrous, resilient material whereby said elements tend to resist the deformation caused by the attaching of the article to the nose and hence grip the sides of the nose of the wearer, adjacent elements having edges which are in contact when the adjacent elements are in the same plane, said element edges extending to the edge of said notch.

FFORD BURCHELL.